UNITED STATES PATENT OFFICE.

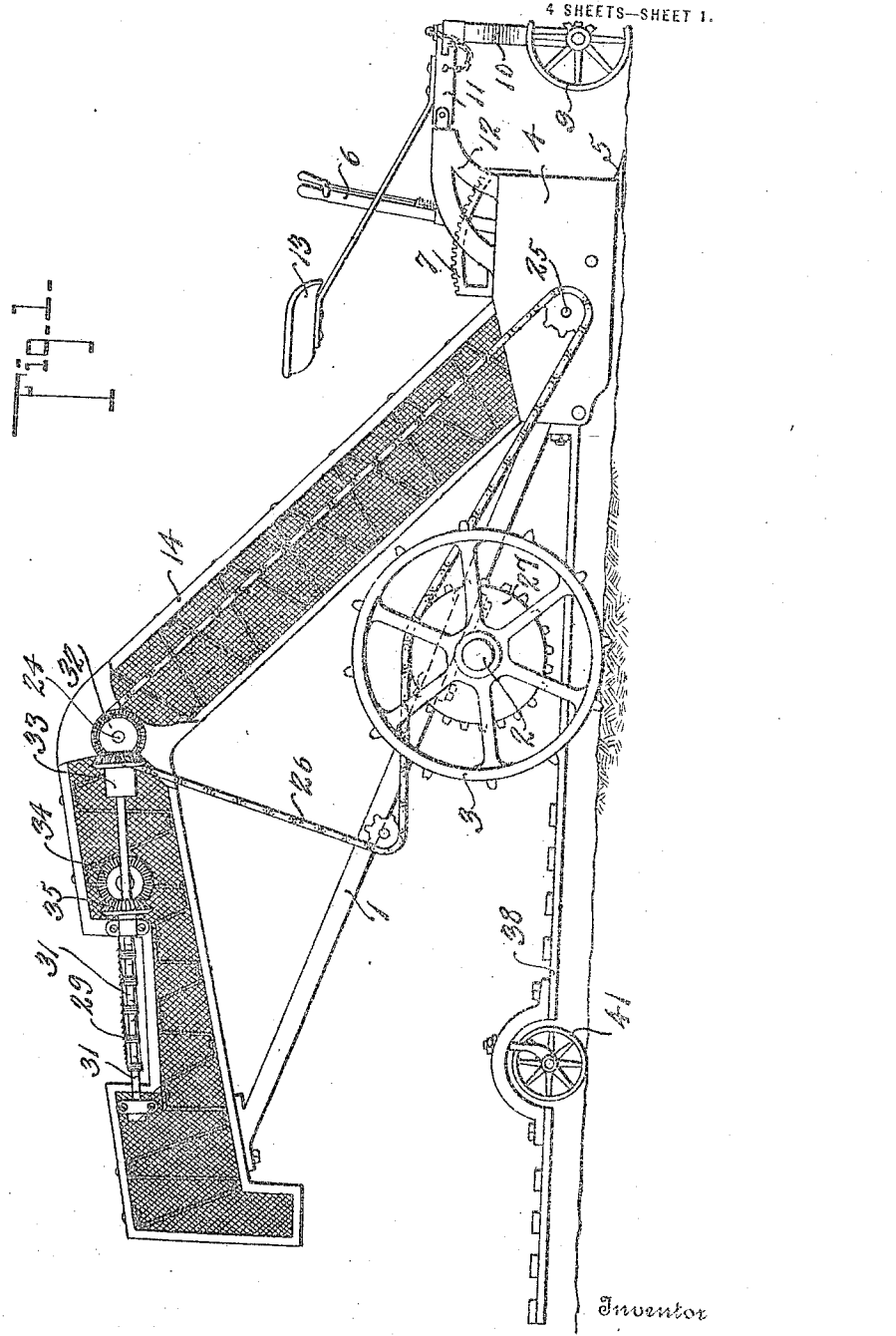

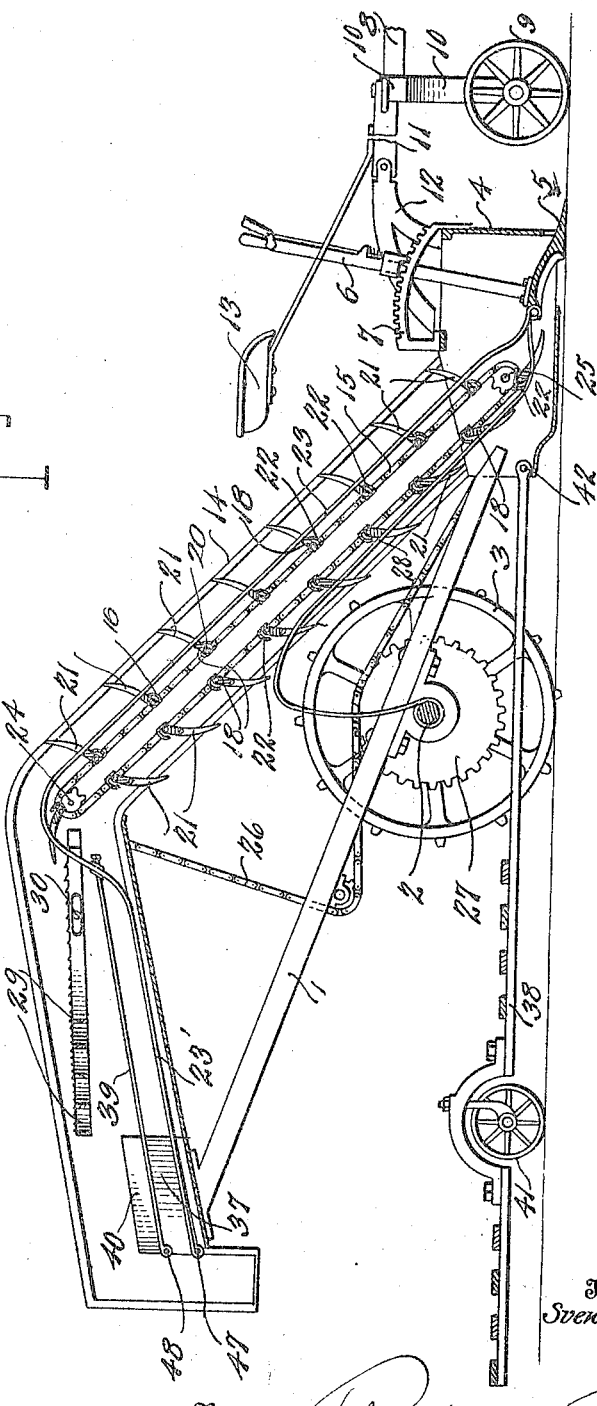

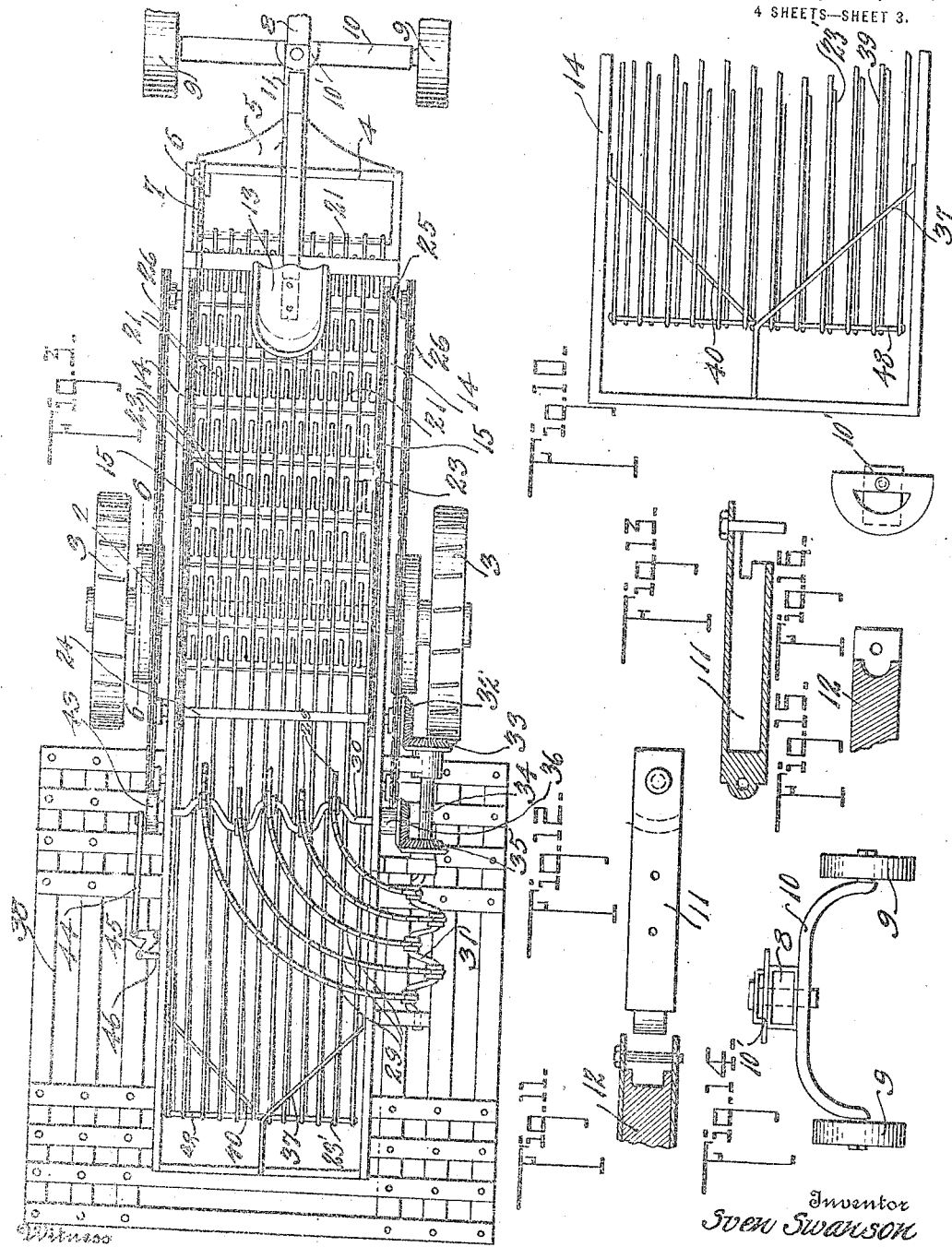

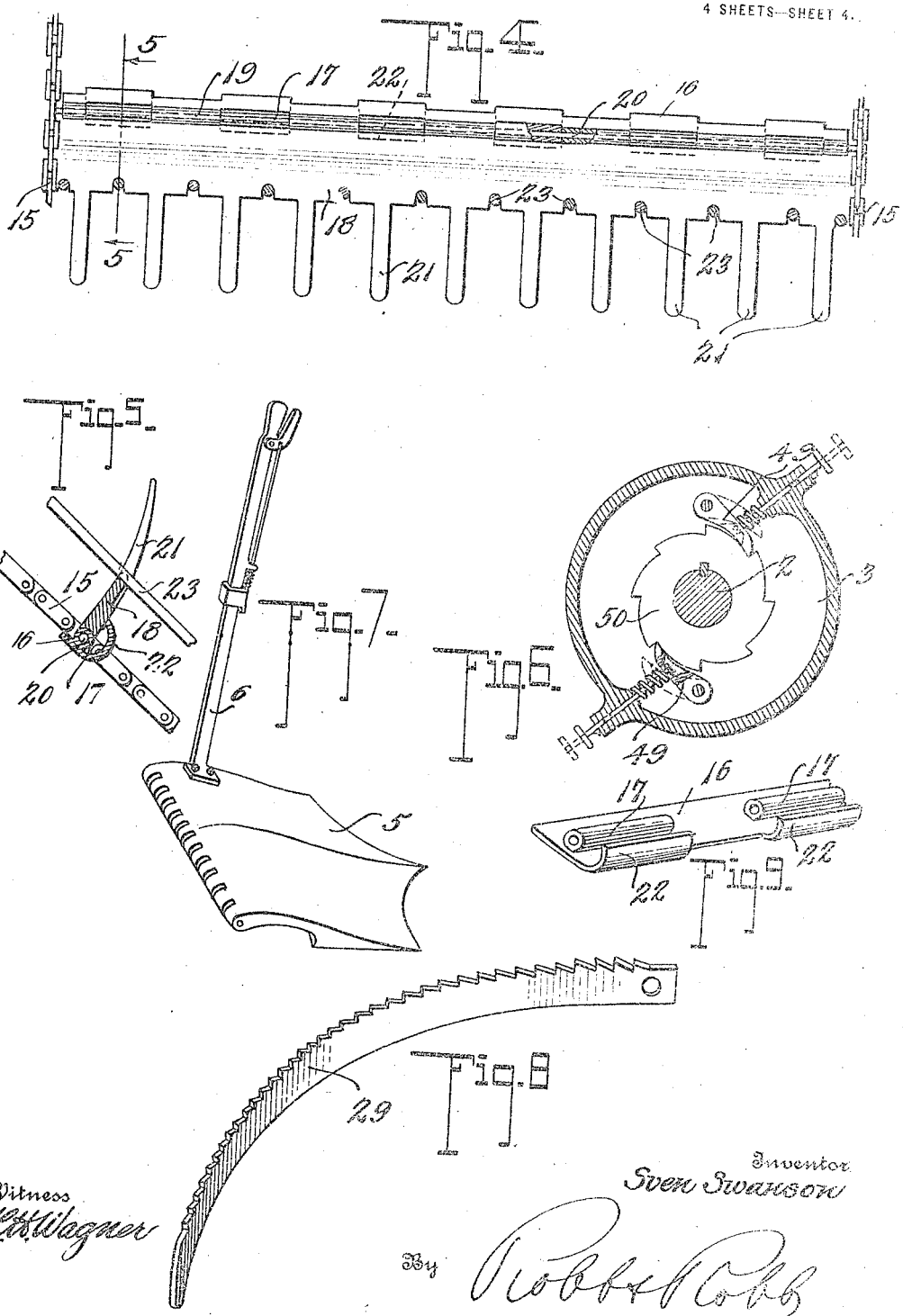

SVEN SWANSON, OF CHICAGO, ILLINOIS.

POTATO-DIGGER.

1,180,251.

Specification of Letters Patent.    Patented Apr. 18, 1916.

Application filed June 25, 1915. Serial No. 36,217.

*To all whom it may concern:*

Be it known that I, SVEN SWANSON, a subject of the King of Sweden, residing at Chicago, in the county of Cook and State of Illinois, have invented certain new and useful Improvements in Potato-Diggers, of which the following is a specification.

The present invention relates to improvements in that type of potato diggers disclosed by my previous Patent No. 988,835, dated April 4, 1911, the characterizing novel feature lying primarily in the conveying mechanism, by means of which the potatoes are elevated to the vine and weed separating and potato sorting instrumentalities.

In the carrying out of my present improvements, an object has been to provide means to receive the potatoes from the plow or excavating member with which fingers carried by the conveyer coact to elevate the potatoes, said receiving means tending to hold the fingers in proper position during that portion of their travel in which they perform their elevating function, and forming at the end portion a sorting element for the potatoes.

Another object is to provide weed separating mechanism which coöperates with the conveying means aforesaid to receive therefrom the vines and weeds and deflect them laterally from the machine as the potatoes pass to the sorting instrumentalities.

A still further object is to provide means for vibrating the sorting screens or members to facilitate separation of the different sizes of potatoes.

These and such other objects as may hereinafter appear are attained by the novel construction, combination and arrangement of parts to be hereinafter specifically described and claimed.

Reference will now be had to the accompanying drawings forming a part of this specification, wherein:

Figure 1 is a side elevation of a machine constructed in accordance with this invention. Fig. 2 is a longitudinal sectional view. Fig. 3 is a top plan view. Fig. 4 is an enlarged view of one of the conveyer members and showing in section the potato receiving elements with which it coöperates. Fig. 5 is a sectional view taken about on the line 5—5 of Fig. 4. Fig. 6 is a sectional view on the line 6—6 of Fig. 3, showing the ratchet mechanism for one of the wheels. Fig. 7 is a perspective view of the plow and adjusting lever therefor. Fig. 8 is a perspective view of one of the agitating bars of the weed separating mechanism.
Fig. 9 is a fragmentary view of a transverse conveyer bar. Fig. 10 is a plan view of the sorting screens. Fig. 11 is a fragmentary sectional view of the bracket for connecting the machine to the guiding truck. Fig. 12 is a plan view of the connecting link between the bracket and the guiding truck. Fig. 13 is a longitudinal sectional view of the connecting link. Fig. 14 is a front elevation of the guiding truck.
Fig. 15 is a longitudinal fragmentary horizontal sectional view of the bracket portion shown in Fig. 11. Fig. 16 is a top plan view of the pin receiving head, for guiding the truck.

Throughout the following detail description, and on the several figures of the drawings, similar parts are referred to by like reference characters.

Describing the apparatus forming the embodiment of my invention, 1 designates a frame supported centrally upon the axle 2 on which are mounted the driving or ground wheels 3. At the forward portion of the frame is fixed a hopper 4 for confining the potatoes as they are excavated by the plow 5, pivoted to the front extremity of the machine and substantially within the hopper just referred to. A lever 6 is fixed to the plow 5 and provided for adjusting the same to regulate the depth of excavating action, said lever coöperating with the notched segment 7 in the customary manner to maintain adjusted position.

Draft means for the machine comprise the tongue 8 connected to the truck wheels 9 mounted in the yoke 10 through the instrumentality of the pin receiving connection 10', to which is pivotally connected the coupling link 11, in turn connected to the bracket 12 secured to the front of the machine, or more properly speaking, to the hopper 4 at this point. The connection between the parts 11 and 12 is such as to allow a certain amount of free movement vertically so that when the truck wheels 9 pass over undulations or rises of the ground, or into hollows as the case may be, the plow 5 will maintain a uniformity of depth of excavation. Secured to the link is a seat 13 for the driver.

Operating between the upper screened frame elements 14, located at each side of the machine, is the conveyer mechanism now to be described. The conveyer chains 15 have connected thereto transverse bar members 16, most clearly shown in Figs. 4, 5 and 9, these members being arranged at suitable intervals apart and each formed with a plurality of spaced rod receiving bearings 17. Elevating bars 18 are mounted on the bar members 16 and are formed with corresponding rod receiving bearings 19 seated between the bearings 17, and connecting rods 20 connect these parts together. The bars 18 are formed with a plurality of fingers 21 slightly curved and adapted to receive or engage the potatoes as they pass from the plow 5 during the excavating or digging operation. These bars obviously have free pivotal movement on the conveyer but are held in proper operative position projecting substantially at right angles from the conveyer during a portion of its travel by stop extensions 22 formed at intervals on the transverse bar members 16.

Just above the conveyer are located a plurality of spaced screening rods 23 which are connected to the front extremity of the machine just in rear of the plow 5 and extend upwardly at an incline between the fingers 21 of the bars 18 and to the rear portion of the machine where they are designated 23' and where they constitute also a sorting screen for the potatoes. The elevating means for the potatoes, therefore, really include the members or rods 23 because potatoes are received from the plow by them and moved upwardly thereover under the actuation of the fingered bars, the fingers of which project between said rods. Not only do the rods perform these functions but they also frictionally engage with the bars 18 when the conveyer is moving, thereby tending to hold said fingered bars back against the stop means 22, in that portion of the travel of these members where they perform their conveying function. The conveyer chains 15 pass around and are driven by the upper and lower transverse shafts 24, 25, these in turn being driven by the main driving chains 26 operating on the driving sprockets 27 carried by the axle 2.

As will be noted by reference to Fig. 2, the fingered bars 18 fall freely into a pendent position after they have passed around the upper shaft 24, and when they approach the lower portion of their travel they pass on to guide rods 28, any suitable number of which are provided beneath the conveyer, secured at their front ends to the forward extremity of the machine and supported at their rear extremities by the axle 2. These guide rods bring the fingers into proper position to receive or engage the potatoes passing from the plow as said fingers move around the shaft 25, after which they are held in conveying position by the rods 23 and the stop means 22, in addition to the holding action due to the weight of the potatoes and vines, acted upon thereby. These vines when the potatoes reach the upper end of the conveyer are thrown on to the separating mechanism which consists of a plurality of arcuate shaped agitating racks 29 mounted at one end upon the crank shaft 30 extending transversely of the frame and just in rear of the conveyer, and at the other end upon the longitudinally extending crank shaft 31. A miter gear 32 on the end portion of the conveyer shaft 24 meshes with a similar gear 33 on the longitudinal shaft 34, carrying also a gear 35 for driving the crank shaft 31 and meshing with the gear 36 for the crank shaft 30. It will be apparent that the alternating movement of the arcuate bars 29 will throw the vines laterally from the machine, as the potatoes fall therebetween upon the sorting instrumentalities.

As before stated, the rods 23' comprise the lowermost screen or sorting instrumentality for the potatoes, said rods being spaced apart sufficiently to retain the smaller potatoes which move to the end of the machine and pass out one side thereof, a deflecting plate 37 directing them to the corner where they fall into a bag or other container (not shown) that is carried by the bag supporting platform 38 connected to the machine below the frame 1. The upper sorting screen consists of bars 39 which are spaced apart a greater distance than the bars 23' so that the larger potatoes are selected thereby and directed into a bag or other container that is provided at the opposite corner of the machine, a deflecting plate 40 assisting in guiding the potatoes to their proper corner. The slatted bag carrying platform 38 is mounted upon the truck wheels 41 and is pivotally connected at 42 to the forward portion of the frame 1 of the machine so as to have free independent movement relative to the frame in passing of the machine over rough ground.

In order to assist in the sorting action, I provide means for vibrating the bars 23' and 39, consisting of a crank shaft 30 connected by the rod 44 to the bell crank 45 pivoted on the side of the upper frame elements, one of the arms of the bell crank being connected by the rod 46 to the side rods of the sorting screens. The rods 23' are connected to the transverse bar 47 at their ends and the rods 39 are likewise connected to the transverse bar 48 so that all of the rods will be shaken during operation of the shaft 30 and by reason of their flexible character.

In order to permit of turning of the machine during its operation, without operating the conveyer, the wheels 3 are provided with ratchet mechanism as shown in Fig. 6, the wheels carry spring actuated pawls 49 which engage the ratchet 50 keyed to the axle or shaft 2 and differential movement of the wheels is thereby permitted.

In the broader aspect of this machine, it will be apparent that the receiving members or rods 23 perform several functions in that they support and hold the potatoes as they are directed upwardly by the fingered bars and said fingered bars are properly held in actuating or potato engaging position by the frictional engagement with said rods. The rods obviously screen the potatoes, as they are elevated, the dirt falling therebetween so that the potatoes arrive at the upper portion of the conveyer in a substantially clean condition, excepting for the weeds and vines which are removed by the arcuate agitating racks. In the vibration of the sorting screens a certain amount of vibratory movement is transmitted down the rods 23, effectually assisting in the screening of the dirt as the potatoes are conveyed upwardly.

Having thus described my invention, what I claim as new is:

1. In a potato digger, the combination with a wheeled frame, and excavating means carried thereby, of elevating means comprising a conveyer including transverse potato engaging members, and receiving means disposed over the conveyer on which the potatoes are conveyed by the engaging members, said means constituting screening means for removing the dirt from the potatoes and extending beyond the conveyer to form a vibratory potato sorting element.

2. In a potato digger, the combination with a wheeled frame, and excavating means carried thereby, of elevating means comprising a conveyer including transverse potato engaging members, receiving means disposed over the conveyer on which the potatoes are conveyed by the engaging members, said means constituting screening means for removing the dirt from the potatoes and extending beyond the conveyer to form a potato sorting element, and means for vibrating the sorting portion of said receiving means.

3. In a potato digger, the combination with a wheeled frame, and excavating means carried thereby, of elevating means comprising a conveyer including transverse potato engaging members, and means engaged by said engaging members for holding said engaging members in operative position, said means supporting the potatoes during conveying action.

4. In a potato digger, the combination with a wheeled frame and excavating means carried thereby, of elevating means consisting of transverse bar members, potato engaging members movably connected to the bar members, and means on said bar members limiting movement of said engaging members; and means for holding the latter in coöperation with the limiting means during conveying action.

5. In a potato digger, the combination with a wheeled frame and excavating means carried thereby, of elevating means consisting of transverse bar members, potato engaging members movably connected to the bar members, and means on said bar members limiting movement of said engaging members; and means for holding the latter in coöperation with the limiting means during conveying action, said holding means supporting the potatoes as they are elevated.

6. In a potato digger, the combination with a wheeled frame and excavating means carried thereby, of elevating means consisting of transverse bar members, fingered bars disposed on said bar members, and means pivotally connecting the finger bars to the bar members aforesaid; and potato receiving rods arranged between the fingers of the fingered bars and having engagement therewith to hold said bars offstanding from the conveyer.

7. In a potato digger, the combination with a wheeled frame and excavating means carried thereby, of elevating means consisting of transverse bar members, fingered bars pivotally mounted thereon, stop means on said bar members for holding the fingered bars in operative position in one portion of travel of the conveyer; and guide means disposed adjacent to the conveyer for holding the fingered bars in position to engage the potatoes as they pass from the excavating means.

8. In a potato digger, the combination with a wheeled frame and excavating means carried thereby, of elevating means consisting of transverse bar members, fingered bars pivotally mounted thereon, stop means on said bar members for holding the fingered bars in operative position in one portion of travel of the conveyer, guide means disposed adjacent to the conveyer for holding the fingered bars in position to engage the potatoes as they pass from the excavating means, and screening and supporting rods extending from the excavating means over the conveyer.

9. In a potato digger, the combination with a wheeled frame, and an excavating member, of a conveyer, means for receiving the potatoes from the excavating member arranged adjacent to the conveyer, engaging members on said conveyer coacting with the receiving means, said receiving means comprising spaced flexible rods extending beyond the conveyer to form a potato sorting screen, and means connected to the sorting extensions for vibrating said sorting elements.

10. In a potato digger, the combination of an excavating member, elevating means for the potatoes, and means for separating vines from said potatoes, comprising arcuate agitating racks, and means for alternately actuating said racks to cause progressive discharge of the vines laterally from the machine.

11. In a potato digger, the combination of an excavating member, elevating means for the potatoes, and means for separating vines from said potatoes, comprising arcuate agitating racks, and means for actuating said racks to cause discharge of the vines laterally from the machine, said actuating means including a crank shaft to which the actuating racks are connected at one end.

12. In a potato digger, the combination of an excavating member, elevating means for the potatoes, and means for separating vines from said potatoes, comprising arcuate agitating racks, and means for actuating said racks to cause discharge of the vines laterally from the machine, said actuating means including a transverse crank shaft to which the racks are connected at one end and a longitudinally extending crank shaft to which the racks are connected at their other end.

In testimony whereof I affix my signature.

SVEN SWANSON.